United States Patent
Tsukamoto et al.

(10) Patent No.: US 8,314,570 B2
(45) Date of Patent: Nov. 20, 2012

(54) HIGH PRESSURE DISCHARGE LAMP LIGHT SOURCE DEVICE

(75) Inventors: Takuya Tsukamoto, Himeji (JP); Minoru Fukuda, Himeji (JP); Tomoyoshi Arimoto, Himeji (JP)

(73) Assignee: Ushio Denki Kabushiki Kaisha, Tokyo (JP)

( * ) Notice: Subject to any disclaimer, the term of this patent is extended or adjusted under 35 U.S.C. 154(b) by 309 days.

(21) Appl. No.: 12/750,064

(22) Filed: Mar. 30, 2010

(65) Prior Publication Data

US 2010/0244720 A1    Sep. 30, 2010

(30) Foreign Application Priority Data

Mar. 31, 2009   (JP) ................................ 2009-085098

(51) Int. Cl.
 *H05B 37/02*   (2006.01)

(52) U.S. Cl. .................. 315/291; 315/224; 315/300

(58) Field of Classification Search .............. 315/46–49, 315/247, 209 R, 94–107, 224, 279, 291, 300
See application file for complete search history.

(56) References Cited

U.S. PATENT DOCUMENTS

| | | | |
|---|---|---|---|
| 7,023,144 B2 | 4/2006 | Suzuki et al. | |
| 7,622,869 B2 | 11/2009 | Watanabe et al. | |
| 2004/0178733 A1* | 9/2004 | Tukamoto et al. | 313/634 |
| 2005/0269925 A1* | 12/2005 | Kobayashi et al. | 313/113 |
| 2007/0024207 A1* | 2/2007 | Harada et al. | 315/246 |
| 2008/0315786 A1* | 12/2008 | Weichmann et al. | 315/291 |
| 2009/0009095 A1 | 1/2009 | Pekarski et al. | |
| 2009/0200954 A1* | 8/2009 | Li et al. | 315/246 |

* cited by examiner

*Primary Examiner* — Jacob Y Cho
*Assistant Examiner* — Henry Luong
(74) *Attorney, Agent, or Firm* — Roberts Mlotkowski Safran & Cole, P.C.; David S. Safran

(57) ABSTRACT

A high pressure discharge lamp light source device is provided having a quartz glass discharge vessel enclosing two opposed electrodes that are spaced apart by at most 2.0 mm, each electrode having a projection formed at a tip end thereof, at least 0.20 mg/mm$^3$ of mercury and a halogen; and a power supply device for supplying alternating current to the lamp, The power supply device is adapted to switch between a nominal electric power lighting mode and a low electric power lighting mode having a defined current value in a range of 40 to 70% of a nominal electric power consumption. In the low power mode, the power supply alternately supplies a base current in a range between 100 Hz and 5 kHz a boost current having a higher current value than that of the base current.

1 Claim, 15 Drawing Sheets (1) Nominal electric power lighting mode (2) Low electric power lighting mode
Base lighting (3) Low electric power lighting mode
Boost lighting (4) Low electric power lighting mode
Base lighting (5) Low electric power lighting mode
Boost lighting

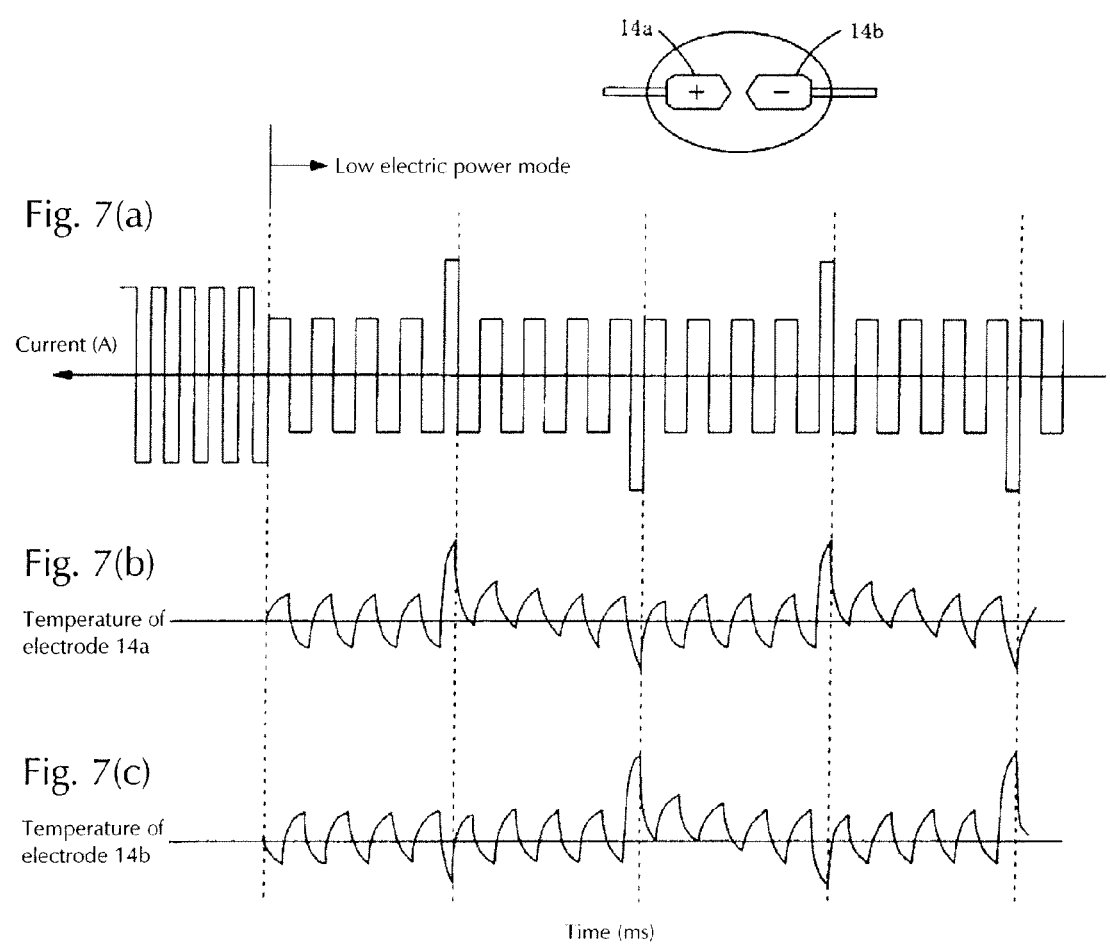

(1) Nominal electric power lighting mode (2) Low electric power lighting mode
Base lighting (3) Low electric power lighting mode
Boost lighting (4) Low electric power lighting mode
Boost lighting (5) Low electric power lighting mode
Base lighting

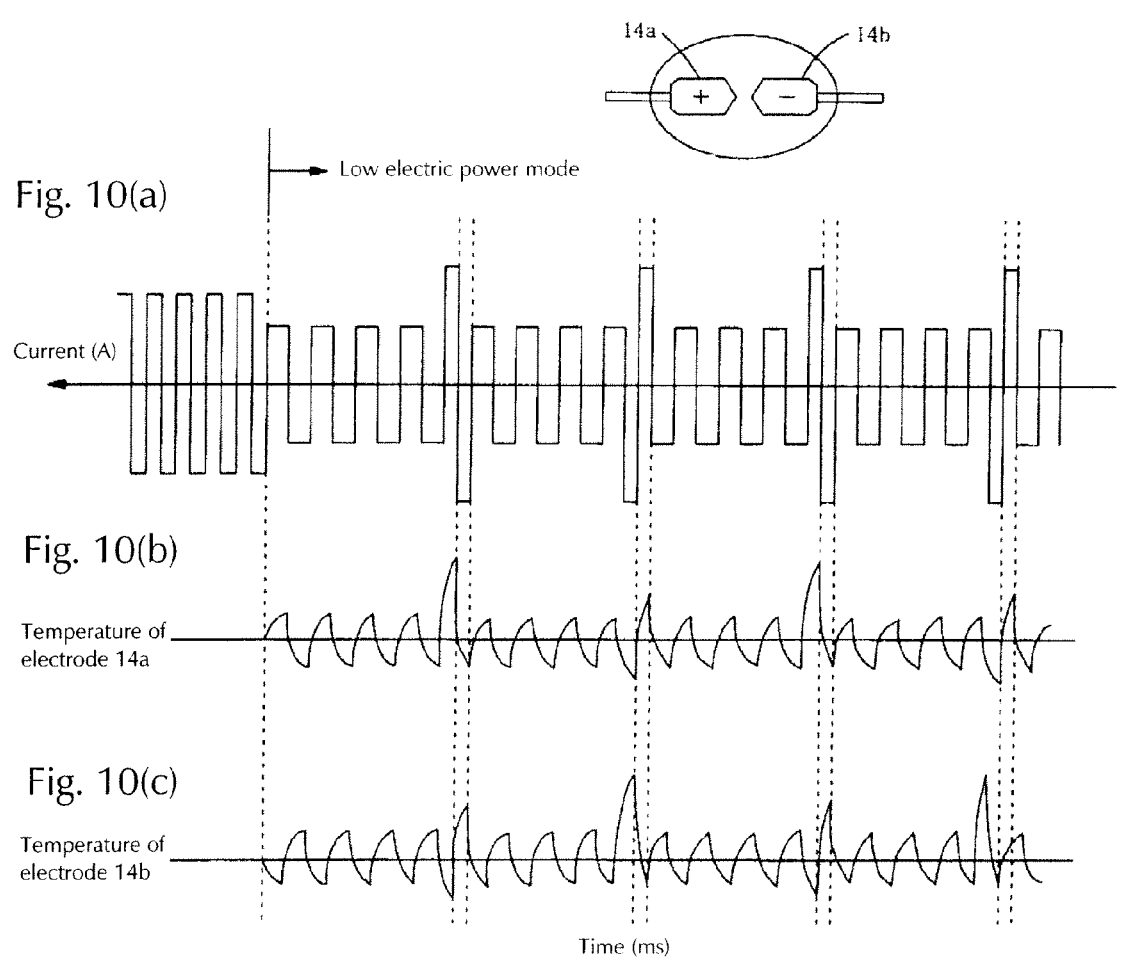

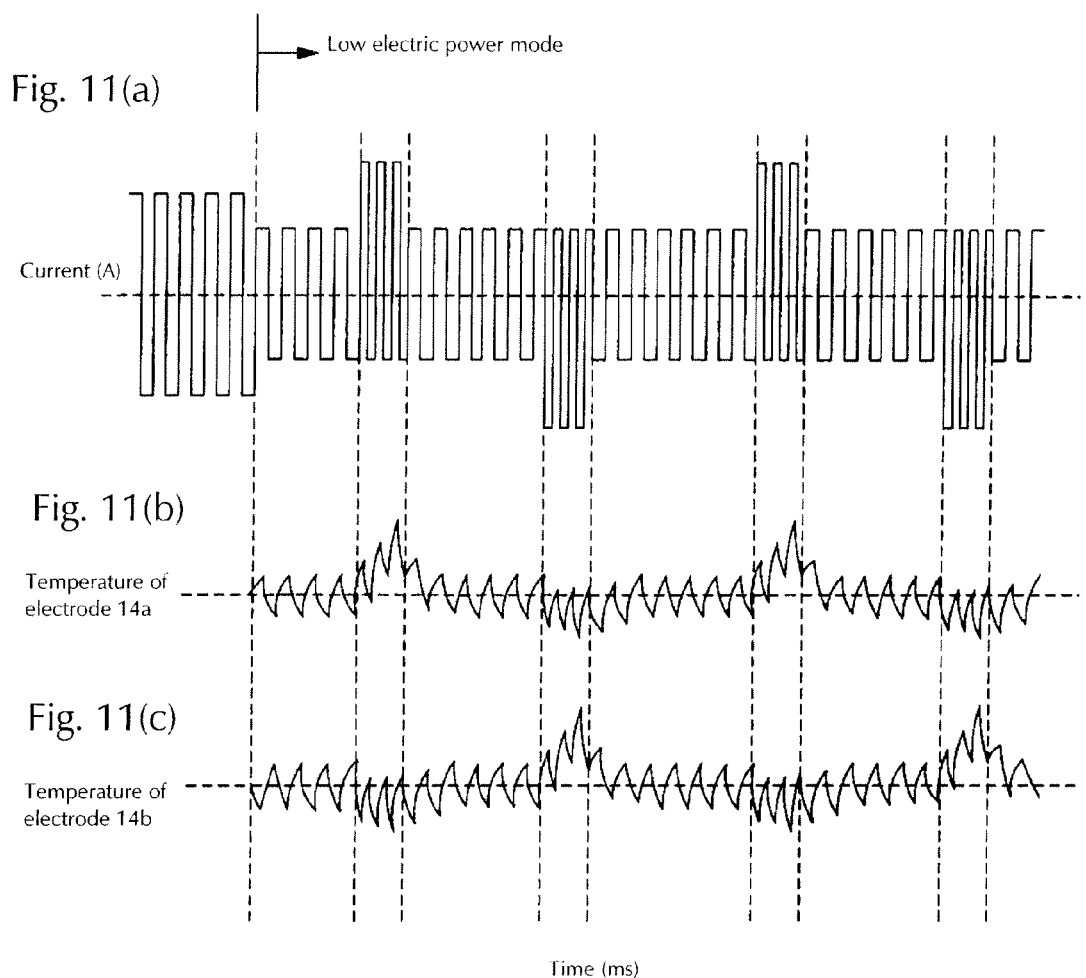

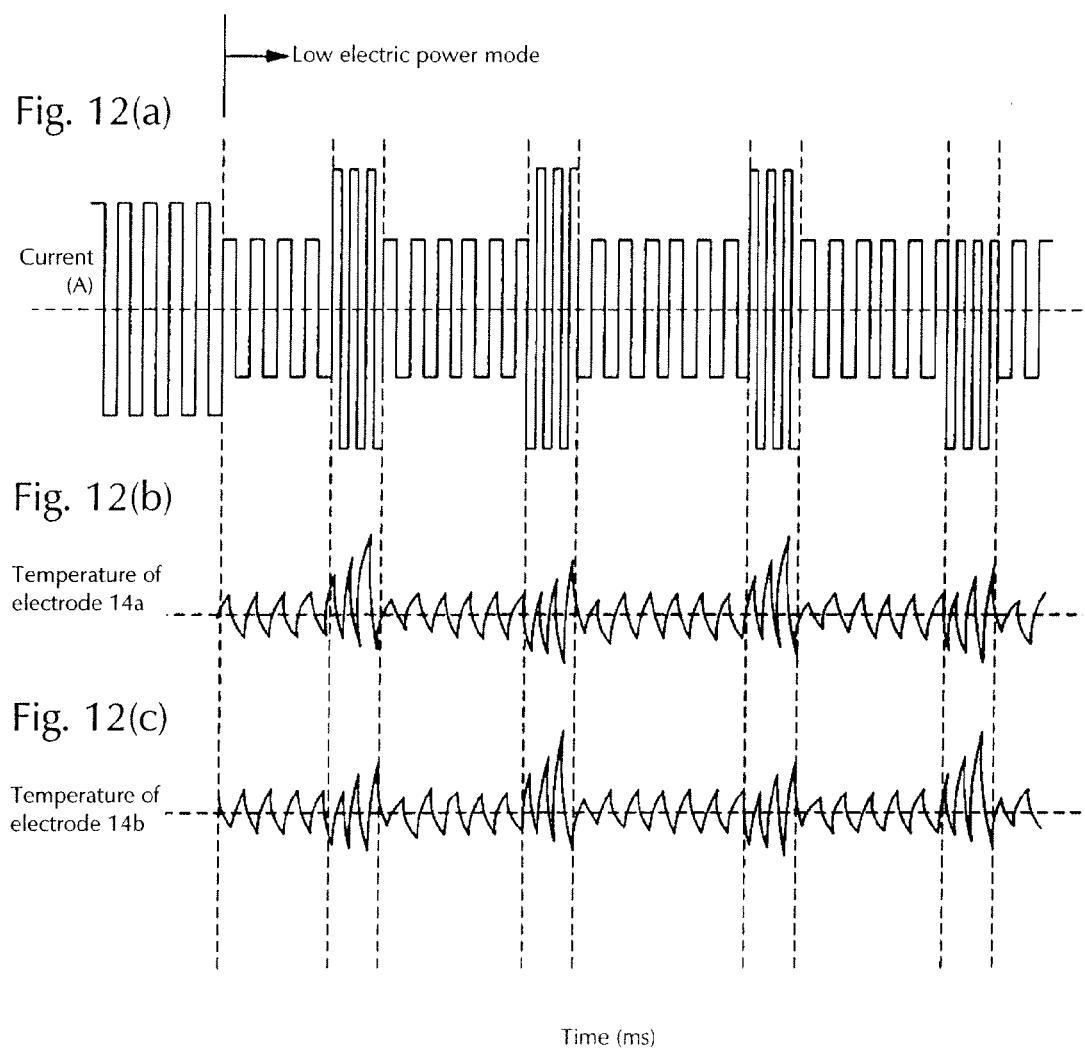

Fig. 13

| Waveform parameter | | | | | Lamp rated 180 W | | | Lamp rated 275 W | | | Lamp rated 450 W | | |
|---|---|---|---|---|---|---|---|---|---|---|---|---|---|
| Low power frequency | Boost rate | Boost width | Boost interval | a×b÷c | 130W (72%) | 90W (50%) | 70W (39%) | 195W (71%) | 138W (50%) | 105W (38%) | 320W (71%) | 225W (50%) | 170W (38%) |
| Hz | a | b (ms) | c (ms) | | 70% | 50% | 40% | 70% | 50% | 40% | 70% | 50% | 40% |
| 2000 | 1.2 | 0.1 | 400 | 0.0003 | × | × | × | × | × | × | × | × | × |
| 2000 | 2.4 | 0.1 | 400 | 0.0006 | × | × | × | × | × | × | × | × | × |
| 90 | 3.5 | 0.1 | 400 | 0.0009 |  | × | × |  | × | × |  |  | × |
| 100 | 3.5 | 0.1 | 400 | 0.0009 |  |  |  |  |  |  |  |  |  |
| 1000 | 3.5 | 0.1 | 400 | 0.0009 |  |  |  |  |  |  |  |  |  |
| 2000 | 3.5 | 0.1 | 400 | 0.0009 |  |  |  |  |  |  |  |  |  |
| 5000 | 3.5 | 0.1 | 400 | 0.0009 |  |  |  |  |  |  |  |  |  |
| 6000 | 3.5 | 0.1 | 400 | 0.0009 |  |  |  | × |  |  | × |  |  |
| 2000 | 2.4 | 0.2 | 500 | 0.0010 | × | × | × | × | × | × | × | × | × |
| 2000 | 4 | 0.1 | 400 | 0.0010 |  |  |  | × |  |  | × | × |  |
| 2000 | 1.2 | 0.1 | 100 | 0.0012 |  |  |  |  |  |  |  |  |  |
| 2000 | 1.2 | 0.4 | 400 | 0.0012 |  |  |  |  |  |  |  |  |  |
| 2000 | 2.4 | 0.2 | 400 | 0.0012 |  |  |  |  |  |  |  |  |  |
| 2000 | 1.1 | 0.5 | 400 | 0.0014 | × | × | × | × | × | × | × | × | × |
| 2000 | 1.2 | 0.05 | 40 | 0.0015 | × | × | × |  |  | × |  |  | × |
| 2000 | 1.2 | 0.1 | 40 | 0.0030 |  |  |  |  |  |  |  |  |  |
| 2000 | 1.2 | 1 | 400 | 0.0030 |  |  |  |  |  |  |  |  |  |
| 2000 | 2.4 | 0.1 | 40 | 0.0060 |  |  |  |  |  |  |  |  |  |
| 2000 | 2.4 | 1 | 400 | 0.0060 |  |  |  |  |  |  |  |  |  |
| 2000 | 1.1 | 3 | 400 | 0.0083 | × | × | × |  | × | × |  |  |  |
| 2000 | 3.5 | 0.1 | 40 | 0.0088 |  |  |  |  |  |  |  |  |  |
| 2000 | 3.5 | 1 | 400 | 0.0088 |  |  |  |  |  |  |  |  |  |
| 2000 | 1.2 | 3 | 400 | 0.0090 |  |  |  |  |  |  |  |  |  |

Fig. 14

| Waveform parameter | | | | | Lamp rated 180 W | | | Lamp rated 275 W | | | Lamp rated 450 W | | |
|---|---|---|---|---|---|---|---|---|---|---|---|---|---|
| Low power frequency | Boost rate | Boost width | Boost interval | a×b÷c | 130W (72%) | 90W (50%) | 70W (39%) | 195W (71%) | 138W (50%) | 105W (38%) | 320W (71%) | 225W (50%) | 170W (38%) |
| Hz | a | b (ms) | c (ms) | | 70% | 50% | 40% | 70% | 50% | 40% | 70% | 50% | 40% |
| 2000 | 1.2 | 4 | 400 | 0.0120 | × | × | × | × | × | × | × | × | × |
| 2000 | 2.4 | 3 | 500 | 0.0144 | × | × | × | × | × | × | × | × | × |
| 2000 | 2.4 | 3 | 500 | 0.0144 | × | × | × | × | × | × | × | × | × |
| 2000 | 3.5 | 0.05 | 10 | 0.0175 | | | | | | | | | |
| 2000 | 2.4 | 3 | 400 | 0.0180 | | | | | | | | | |
| 2000 | 4 | 2 | 400 | 0.0200 | × | × | × | × | × | × | × | × | × |
| 2000 | 3.5 | 3 | 500 | 0.0210 | × | × | × | × | × | × | × | × | × |
| 2000 | 3.5 | 3 | 400 | 0.0263 | | | | | | | | | |
| 90 | 1.2 | 1 | 44.4 | 0.0270 | | | × | | | | | | |
| 100 | 1.2 | 1 | 40 | 0.0300 | | | | | | | | | |
| 1000 | 1.2 | 1 | 40 | 0.0300 | | | | | | | | | |
| 2000 | 1.2 | 1 | 40 | 0.0300 | | | | | | | | | |
| 5000 | 1.2 | 1 | 40 | 0.0300 | | | | | | | | | |
| 6000 | 1.2 | 1 | 40 | 0.0300 | | | | | | | | | |
| 2000 | 2.4 | 1 | 40 | 0.0600 | | | | | | | | | |
| 2000 | 3.5 | 1 | 40 | 0.0875 | | | | | | | | | |
| 2000 | 1.2 | 3 | 40 | 0.0900 | | | | | | | | | |
| 2000 | 1.2 | 0.1 | 1 | 0.1200 | | | | | | | | | |
| 90 | 2.4 | 3 | 44.4 | 0.1622 | | × | × | | | × | | | |
| 2000 | 3.5 | 0.05 | 1 | 0.1750 | | | | | | | | | |
| 100 | 2.4 | 3 | 40 | 0.1800 | | | | | | | | | |
| 1000 | 2.4 | 3 | 40 | 0.1800 | | | | | | | | | |
| 5000 | 2.4 | 3 | 40 | 0.1800 | | | | | | | | | |
| 6000 | 2.4 | 3 | 40 | 0.1800 | | | | | | | | | |
| 2000 | 2.4 | 3 | 40 | 0.1800 | | | | | | | | | |
| 2000 | 2 | 4 | 40 | 0.2000 | | | | | | | | | |
| 2000 | 1.2 | 0.1 | 0.5 | 0.2400 | | | | | | | | | |
| 2000 | 2.4 | 0.1 | 1 | 0.2400 | | | | | | | | | |
| 2000 | 3.5 | 3 | 40 | 0.2625 | | | | | | | | | |
| 2000 | 3.5 | 0.1 | 1 | 0.3500 | | | | | | | | | |

Fig. 15

| Waveform parameter | | | | | Lamp rated 180 W | | | Lamp rated 275 W | | | Lamp rated 450 W | | |
|---|---|---|---|---|---|---|---|---|---|---|---|---|---|
| Low power frequency | Boost rate | Boost width | Boost interval | a×b÷c | 130W (72%) | 90W (50%) | 70W (39%) | 195W (71%) | 138W (50%) | 105W (38%) | 320W (71%) | 225W (50%) | 170W (38%) |
| Hz | a | b (ms) | c (ms) | | 70% | 50% | 40% | 70% | 50% | 40% | 70% | 50% | 40% |
| 90 | 3.5 | 3 | 11 | 0.9545 | | | | | | | | | |
| 100 | 3.5 | 3 | 10 | 1.0500 | | | | | | | | | |
| 2000 | 1.1 | 1 | 1 | 1.1000 | | | | | | | | | |
| 2000 | 1.2 | 1 | 1 | 1.2000 | | | | | | | | | |
| 2000 | 4 | 1 | 2 | 2.0000 | | | | | | | | | |
| 2000 | 2.4 | 1 | 1 | 2.4000 | | | | | | | | | |
| 2000 | 2 | 3 | 2 | 3.0000 | | | | | | | | | |
| 2000 | 4 | 1.5 | 2 | 3.0000 | | | | | × | | | × | × |
| 2000 | 1.1 | 3 | 1 | 3.3000 | | | × | | | × | | | |
| 2000 | 3.5 | 0.5 | 0.5 | 3.5000 | × | | | | × | × | × | × | × |
| 2000 | 3.5 | 1 | 1 | 3.5000 | | | | | | | | | |
| 2000 | 3.5 | 1 | 1 | 3.5000 | | | | | | | | | |
| 6000 | 3.5 | 1 | 1 | 3.5000 | | | | | × | | | × | × |
| 1000 | 3.5 | 2 | 2 | 3.5000 | | | | | | | | | |
| 2000 | 3.5 | 2 | 2 | 3.5000 | | | | | | | | | |
| 5000 | 3.5 | 2 | 2 | 3.5000 | | | | | | | | | |
| 2000 | 3.5 | 3 | 3 | 3.5000 | | | | | | | | | |
| 2000 | 3.5 | 4 | 4 | 3.5000 | × | × | × | × | × | | × | × | |
| 2000 | 1.2 | 3 | 1 | 3.6000 | × | × | | × | × | | × | × | × |
| 2000 | 2.4 | 3 | 1 | 7.2000 | × | × | × | × | × | × | × | × | × |
| 2000 | 3.5 | 3 | 1 | 10.5000 | × | × | × | × | × | × | × | × | × |

(1) Nominal electric power lighting mode (2) Low electric power lighting mode (initial)

(3) Low electric power lighting mode

HIGH PRESSURE DISCHARGE LAMP LIGHT SOURCE DEVICE

BACKGROUND OF THE INVENTION

1. Field of the Invention

The present invention relates to a high pressure discharge lamp light source device and particularly to a high pressure discharge lamp light source device which is capable of a stable lighting even if the lamp power is reduced to 40 to 70% of the rated electric power consumption.

2. Description of the Prior Art

High pressure discharge lamps, where at least 0.20 mg/mm$^2$ mercury are enclosed in the interior of the light emission tube are known.

Among projector devices, in which such high pressure discharge lamp light source devices are suitably used, projectors employing a so-called 'eco mode' which uses less electric power than the rated electric power have become common. The known 'eco mode' is a mode using electric power which has been suppressed to an amount of approximately 80% of the rated electric power. It is, in other words, a mode of 'lighting with little electric power'. During the duration of such an eco mode the temperature of the electrode tip ends decreases because of the constraint of the electric power applied to the electrode tip ends, the position of the arc becomes unstable, and the occurrence of flicker is promoted. Techniques for the suppression of flicker in the above mentioned lamps are known, for example, from JP 2006-059790 A and corresponding U.S. Pat. No. 7,023,144 B2 as well as JP 2008-509518 A and corresponding US 2009/009095 A1, which, however, do not improve the flicker during this low electric power lighting mode.

The technique stated in JP 2006-059790 A and corresponding U.S. Pat. No. 7,023,144 B2 is characterized by the lighting frequency in the alternating current lighting mode. The frequency is controlled and a projection of the electrode tip end is formed projecting at the electrode tip end, and the arc is stabilized by rendering this projection the starting point of the arc. For the arc stabilization it is necessary that the size of the projection of the electrode tip end is controlled to a desired state according to the electric power, and one of the control methods is to change the drive frequency. It is known that the projection becomes thick at a low frequency and thin at a high frequency, but the projection cannot be maintained by only repeating the waveform. With regard to this problem, the lighting frequency at which the maintenance and the stabilization of the projection can be accomplished is examined in the technique of JP 2006-059790 A and corresponding U.S. Pat. No. 7,023,144 B2, and a stabilization of the arc is expected.

By means of the above mentioned technique it was possible to maintain the arc stable even in a low electric power lighting mode such as the known eco mode.

In recent years, the needs have increased for projector devices to utilize a 'brightness adjustment mode' which employs a dimming function using a reduction of the lamp current according to the screen and an increase of the contrast, or a 'super-eco mode' using a further decrease of the electric power. Because of this situation, the lamp power is further constrained at the time of low electric power, and concretely a reduction of up to 40 to 70% of the rated power consumption is necessary. But when the electric power is such decreased and reduced to less than 70% of the rated lighting, the arc becomes unstable even if measures are taken using generally known techniques, and before long flicker occurs.

The reason is explained in the following with regard to FIG. 16. In FIG. 16, 101 and 102 are respectively spherical parts of electrodes provided in the light emission tube of a high pressure discharge lamp, 101a and 102a are projections formed at the tip ends of the spherical parts, and 103 is the arc. When lighting with the rated electric power, the arc 103 is maintained by means of projection portions 101a, 102a with a relatively small volume provided beforehand at the tip ends of the spherical parts 101, 102 as shown in FIG. 16 (1). At this time, the size of the projections 101a, 102a and the size of the electric power are balanced, the electrode tip end parts are maintained at a high temperature and the electron release is rendered easy.

When using the low electric power lighting mode with at most 70% of the rated electric power, the temperature of the tip end parts decreases with the decrease of the electric power. Therefore, the electrode tip end temperature becomes too low with this size of the projections, a stable thermal electron release becomes impossible and the arc 103 having been stable for a long time cannot be maintained anymore. When the low temperature state of the electrode tip ends continues, the starting point of the arc 103 at the projection tip end moves with a short temporal cycle and, when having moved, forms another small projection (secondary projection). Resulting from the repetition of the movement of the arc 103 and the forming of a projection, a plurality of secondary projection is formed, and as shown in FIG. 16 (2) and (3), the arc 103 moves between the secondary projections.

When this situation occurs, the time of stay of the starting point of the arc at these secondary projections becomes long and the starting point of the arc moves between the secondary projections with a long temporal cycle. The reason for the time of stay of the starting point of the arc at a secondary projection becoming long is that the secondary projection reaches a high temperature because of its small size and a thermal electron release becomes possible. But when the size is too small, it cannot be maintained for a long time and wears off by evaporation, and when the distance (arc gap) between another secondary projection and the opposing electrode tip end becomes smaller, the starting point of the arc moves there.

The forming of secondary projections, the repetition of the forming and disappearance, the impossibility to maintain the arc at a specified position, and the movement of the starting point appear on the screen as flicker. Generally, humans do not perceive light fluctuations with a short cycle (>50 Hz), but light fluctuations with a long cycle (<50 Hz) are perceived. When the flicker of the lamp becomes significant, a flicker in the image projected to the screen appears, which is felt as unpleasant.

When a low electric power lighting mode with at most 70% of the rated electric power is used, as stated above the temperature of the tip end part decreases together with the decrease of the electric power, the arc cannot be maintained at a constant position, the starting point moves, and flicker occurs.

SUMMARY OF THE INVENTION

The invention eliminates the above-described disadvantages in the prior art. The object to be solved by the present invention is to provide a high pressure discharge lamp light source device in which the projections of the electrode tip ends are maintained in the ideal condition and a stable arc can be maintained even if the lamp is lighted with a lamp power of at most 70% of the rated electric power.

The present invention solves the object mentioned above as follows:

(1) In a high pressure discharge lamp light source device used with the alternating current lighting mode and comprising a power supply device supplying alternating current to the light source device of a high pressure discharge lamp in which a pair of electrodes at the tip end of which a projection is formed is arranged oppositely to each other with a spacing of at most 2.0 mm and mercury of at least 0.20 mg/mm$^3$ and a halogen are enclosed in the discharge vessel, during the low electric power lighting mode lighting with electric power of 40 to 70% as to the rated electric power consumption, a base lighting, at which a base current having a specified frequency chosen from a range between 100 Hz and 5 kHz is supplied to the high pressure discharge lamp, and a boost lighting, at which a boost current Ib (A) having a current value larger than the current value Ia (A) of said base current is supplied are performed alternatingly.

(2) At said boost lighting, the current is supplied such that the lighting conditions stated below are satisfied and the polarity after the base lighting is reversed every time.

With the boost rate from the size (Ib/Ia) of the boost current Ib (A) as to said base current Ia (A) being a, the effective supply time in which said boost current Ib (A) is supplied to one electrode being b (ms), and the time in which said base current Ia (A) is supplied being c (ms), the following lighting conditions, a boost rate a of 1.2 to 3.5,
an effective supply time b of the boost current Ib (A) of 0.1 to 3 (ms),
a supply time c of the base current Ia (A) of 1 to 400 (ms), are satisfied and each parameter is chosen such that a, b and c satisfy the following relation (formula 1):

$$0.0009 \leq a \times b \div c \leq 3.5 \quad \text{(formula 1)}.$$

In order that the starting point of the arc does not move in the low electric power lighting mode it is necessary to take care that no plurality of secondary projections is formed. In the present invention, no plurality of secondary arcs is fowled because a current waveform is provided into which a current, which is boost lighted, is inserted intermittently, and a stabilization of the arc can be realized even in the low electric power lighting mode with at most 70% of the rated power.

BRIEF DESCRIPTION OF THE DRAWINGS

FIG. 7 is a schematic view showing the change of the temperature of the projection portion of the tip ends of the electrodes for the case of lighting the high pressure discharge lamp with the waveform of FIG. 4.

FIG. 10 is a schematic view showing the change of the temperature of the projection portion of the tip ends of the electrodes at the time of the low electric power lighting for the case of lighting the high pressure discharge lamp with the waveform of FIG. 8.

FIG. 11 is a schematic view showing the lighting waveform for the case of performing the half-cycle boost several times and the change of the temperature of the projection portion of the tip ends of the electrodes.

FIG. 12 is a schematic view showing the lighting waveform for the case of performing the full-cycle boost several times and the change of the temperature of the projection portion of the tip ends of the electrodes.

FIG. 13 is a table (1) showing a summary of the lighting conditions and the test results according to embodiments.

FIG. 14 is a table (2) showing a summary of the lighting conditions and the test results according to embodiments.

FIG. 15 is a table (3) showing a summary of the lighting conditions and the test results according to embodiments.

DETAILED DESCRIPTION OF THE INVENTION

Figure 1:
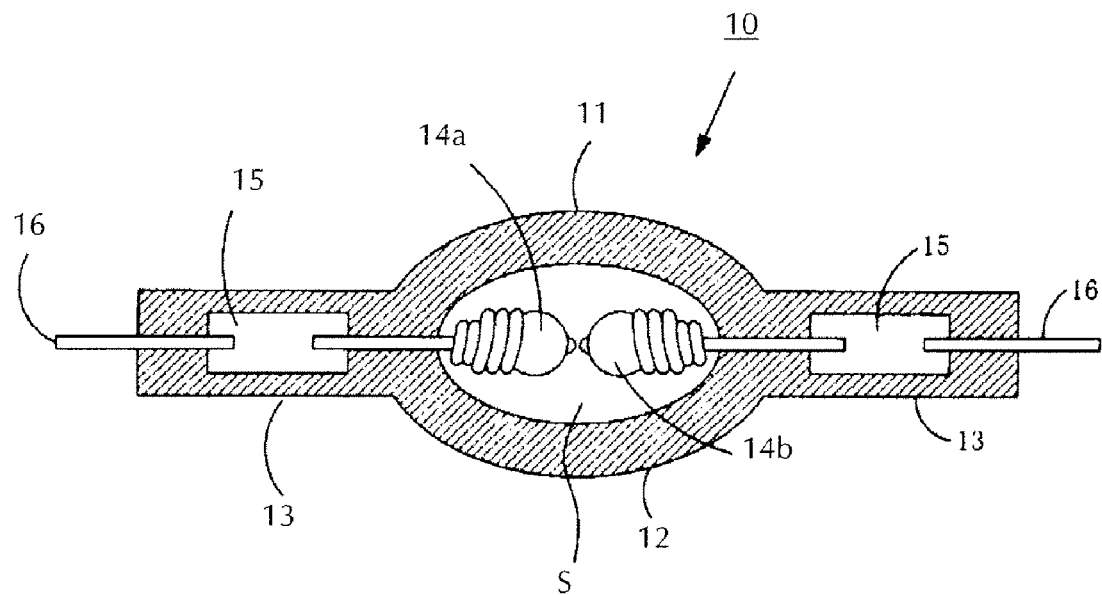
FIG. 1 is a schematic view showing the configuration of a high pressure discharge lamp according to the present invention.
Figure 2:
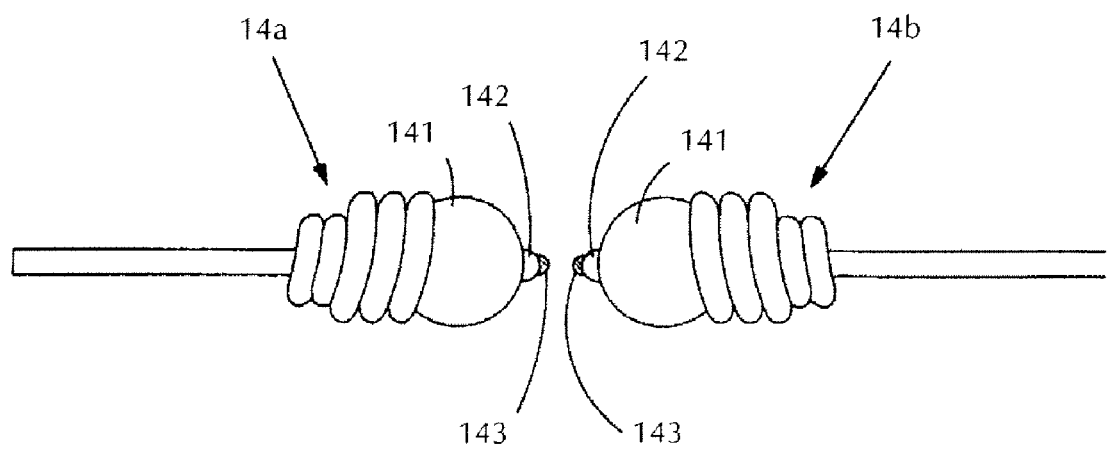
FIG. 2 is a schematic view explaining the state of the electrode tip ends at the time of the low electric power lighting of the high pressure discharge lamp of the present invention.

FIG. 1 is a view showing the configuration of a high pressure discharge lamp according to the present invention, and FIG. 2 is a view showing an example for the configuration of the electrodes of this discharge lamp.

As shown in FIG. 1, a light emission tube 11 of a discharge lamp 10 is made from quartz glass and is configured such that it is provided with an approximately oval spherical light emission tube part 12 and rod shaped sealing tube parts 13 connected to both ends thereof. In the interior of the light emission tube part 12 a pair of electrodes 14a, 14b made from tungsten is arranged oppositely to each other with a spacing between the electrodes of at most 2 mm. As shown in FIG. 2, the electrodes 14a, 14b have a spherical part 141, a primary projection 142 formed at the tip end of the spherical part 141 and a secondary projection 143 formed at the tip end of the primary projection. At the time of the nominal electric power lighting, the high pressure discharge lamp 10 according to this embodiment is lighted by means of the alternating current lighting mode, and the configuration of the electrodes 14a, 14b is completely the same to facilitate the thermal design at the time of the nominal electric power lighting. A band-shaped metal foil 15 made from molybdenum is embedded into the interior of the sealing parts 13. The shaft part of the electrode 14a, 14b is connected to the light emission tube part 12 side of the metal foil 15, while an outer lead rod 16 is connected to the other end.

In the interior of the light emission tube part 12 a discharge space S is formed in which mercury being the discharge medium, a rare gas and a halogen gas are enclosed. The mercury serves to obtain the necessary visible light wavelength, for example discharge light with a wavelength of 360 to 780 nm, and is enclosed in an amount of at least 0.15 mg/mm$^3$. This enclosed amount can differ according to the temperature conditions, but serves to form an extremely high vapor pressure of at least 150 atm at the time of lighting. By enclosing even more mercury a discharge lamp with a high mercury vapor pressure of at least 200 atm or at least 300 atm at the time of lighting can be produced and the higher the mercury vapor pressure becomes, the more it becomes possible to produce a light source suited for a projector device. The rare gas is enclosed with a static pressure of approximately 10 to 26 kPa. Concretely, it is argon gas, and the inclusion of such a rare gas serves to improve the lighting starting characteristics. Regarding the halogen, iodine, bromine or chlorine etc. is enclosed in the form of a compound with mercury or another metal, and the enclosed amount of the halogen is chosen from a range between $10^{-6}$ to $10^{-2}$ µmol/mm$^3$. Although the halogen serves also to extend the durability (to prevent blackening) using the halogen cycle, in case of lamps being extremely small and having a high internal pressure such as the discharge lamp of the present invention it has the function to prevent a devitrification of the light emission tube 10. And further, a metal halide may also be contained in the discharge space S as another discharge medium.

To show a concrete numerical example for such a high pressure discharge lamp, for example the maximum outer diameter of the light emission tube part 12 is 12 mm, the spacing between the electrodes is 1.2 mm, the internal volume of the light emission tube 11 is 120 mm$^3$, the rated voltage is 85 V and the rated electric power is 300 W. The lamp is lighted by means of the alternating current mode. This kind of discharge lamp is mounted in small-scale projector devices, and because a high quantity of light is required despite the fact that the whole dimensions of the device are extremely small, the thermal conditions in the light emission tube part 11 are extremely severe and the value of the tube wall load of the lamp becomes 0.8 to 3.0 W/mm$^2$ and concretely 2.1 W/mm$^2$. Because of the fact that the lamp has such a high mercury vapor pressure and tube wall load value, discharge light with good color rendering properties can be provided when it is arranged in a device for presentation such as a projector device.

When the lamp is lighted in the low electric power region of 40 to 70% of the rated electric power, it can be lighted stably without movement of the starting point when the following lighting conditions are employed. In the present invention the frequency range of the base current at the time of lighting with low electric power is 100 Hz to 5 kHz. The mode in which the lamp is operated with an electric power value of 40 to 70% on average as to the rated electric power consumption is called 'low electric power lighting mode'.

In the low electric power lighting mode, in the present embodiment a base lighting in which alternating current with an arbitrary constant current value (which is called base current value) at a frequency chosen from a range between 100 Hz and 5 kHz is supplied, and a boost lighting in which a boost current having a higher current value than the base current value is supplied with a period of a half cycle, one cycle or a plurality of cycles are performed alternatingly. With the boost rate from the size (Ib/Ia) of the boost current Ib (A) as to said base current Ia (A) being a, the effective supply time in which said boost current Ib (A) is supplied to one electrode being b (ms), and the time in which said base current is supplied (that is, the base lighting period) being c (ms), the lighting conditions are established as follows.
The following conditions,
 a boost rate a of 1.2 to 3.5,
 an effective supply time b of the boost current Ib (A) of 0.1 to 3 (ms),
 a supply time c of the base current Ia (A) of 1 to 400 (ms),
are satisfied, and each parameter is chosen such that a, b and c satisfy the following relation (formula 1):

$$0.0009 \leq a \times b \div c \leq 3.5 \qquad \text{(formula 1)}.$$

Then, in the present embodiment, the polarity of the boost current starting from the base current is changed with every boost lighting.

Figure 3:
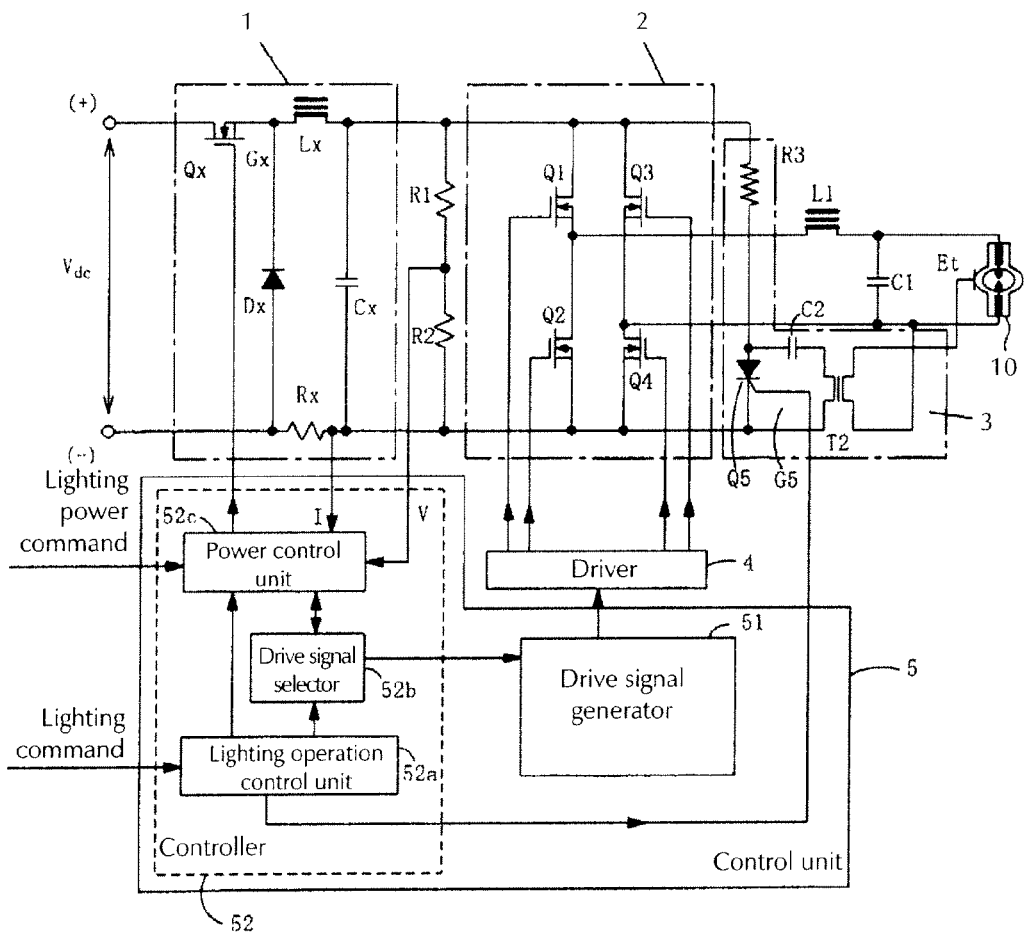
FIG. 3 is a schematic view showing an example for the configuration of a high pressure discharge lamp light source device according to the present invention.

FIG. 3 shows an example for the configuration of the light source device (current supply device) of the embodiment of the present invention.

The light source device comprises a step-down chopper circuit 1 being supplied with a direct current voltage, a full-bridge type inverter circuit 2 (in the following referred to as 'full-bridge circuit') which is connected to the output side of the step-down chopper circuit 1, converts the direct current voltage to an alternating current voltage and supplies it to the discharge lamp, a coil L1, a capacitor C1 and a starter circuit 3 which are connected in series to the discharge lamp 10, a driver 4 which drives switching elements Q1 to Q4 of said full-bridge circuit 2, and a control unit 5. The control unit 5 may consist of a processing device such as a microprocessor, and here its functional configuration is shown by means of a block diagram.

In FIG. 3, the step-down chopper circuit 1 consists of a switching element Qx and an inductor Lx which are connected to the plus terminal of the power source being supplied with direct current, a diode Dx the cathode side of which is connected between the connection point of the switching element Qx and the inductor Lx and the minus terminal of the power source, a smoothing capacitor Cx which is connected to the output side of the inductor Lx, and a resistor Rx for the current detection, which is connected between the minus terminal side of the smoothing capacitor Cx and the anode side of the diode Dx. By means of driving said switching element Qx with a defined duty, the input direct current voltage Vdc is stepped down to a voltage corresponding to this duty. At the output side of the step-down chopper circuit 1, a series circuit of resistors R1, R2 for the voltage detection is provided.

The full-bridge circuit 2 consists of the switching elements Q1 to Q4 which are connected in the shape of a bridge, and by means of alternatingly switching the switching elements Q1, Q4 and the switching elements Q2, Q3 on, a rectangular wave shaped alternating current voltage is generated between the connection point of the switching elements Q1, Q2 and the connection point of the switching elements Q3, Q4.

The starter circuit 3 consists of a series circuit of a resistor R3 and a switching element Q5, a capacitor C2 and a transformator T1. When the switching element Q5 is switched on, the electric load charged in the capacitor C2 is discharged via the switching element Q5 and the primary side coil of the transformator T1, and a pulse shaped high voltage is generated in the secondary side of the transformator T1. This high voltage is applied to the auxiliary electrode Et of the lamp 10, and the lamp is lit.

In this circuit, the control of the output electric power and the regulation of the above mentioned boost rate can be achieved by regulating the operating duty of the switching element Qx of the step-down chopper circuit 1. The switching element Q5 of the step-down chopper circuit 1 switches on and off according to the duty of the gate signal Gx, and the electric power supplied to the lamp 10 changes. That means, a control of the gate signal Gx is performed such that in case of a power-up the duty of Qx is increased and in case of a power-down the duty of Qx is decreased and an electric power value is obtained which corresponds to the input electric power regulation signal value. At the time of a boost, the duty of Qx is increased and a boost current with a larger current value than the base current value flows. The regulation of the alternating current driving frequency is realized by regulating the switching cycle of the switching elements Q1 to Q4 of the full-bridge circuit 2.

The control unit 5 consists of a drive signal generator 51 and a controller 52. The drive signal generator 51 consists, for example, of a processor and generates drive signals to drive the switching elements Q1 to Q4 of the full-bridge circuit 2. The controller 52 is provided with a lighting operation control unit 52a which controls the lighting operation of the lamp 10, a drive signal selector 52b which controls the output of the drive signal generator 51, and a lighting power control unit 52c which drives the switching element Qx of the step-down chopper circuit 1 according to an external lighting power command with a defined duty and controls the lamp power.

The lighting power control unit 52c determines the lamp current I and the lamp voltage V and calculates the lamp power from the voltage at both terminals of the resistor Rx for the current detection and the voltage detected by the resistors R1 and R2 for the voltage detection and controls the duty of the switching element Qx of the step-down chopper circuit 1 such that this power corresponds to the lighting power command. And it distinguishes from the value of the lighting power command between the rated lighting and the low electric power lighting and sends the result of the distinction to the drive signal selector 52b.

When the lighting power control unit 52c, or the lighting power command signal, switches to the low electric power lighting mode by means of switching to the dimming or the super-eco mode, the low electric power lighting signal is sent to the drive signal selector 52b. The drive signal selector 52b sends a drive signal selection signal corresponding to this low electric power signal to the drive signal generator 51. The drive signal generator 51 generates a drive signal according to the drive signal selection signal and sends it to the driver 4. For example, at the times of the rated lighting and the low electric power lighting, a drive signal with a corresponding frequency is outputted while at the boost time a drive signal corresponding to a boost signal is outputted.

The full-bridge circuit 2 performs a polarity reversing operation according to the drive signal from the driver. At the boost time the drive signal selector 52b sends a boost signal to the power control unit 52c, and the power control unit 52c boosts (enlarges) the output electric power as mentioned above at the time the boost signal is outputted. If, as an example, the electric power at a 'normal mode' of a rated lighting is 180 W, the 'eco mode' at the steady-state time is 144 W (80% of the rated electric power), and the 'super-eco mode' and the 'brightness adjustment mode (dimming mode)' of a low electric power lighting are 90 W (50% of the rated electric power). In this case, the drive is performed in the nominal electric power lighting mode with regard to the normal mode and the eco mode, while in the super-eco mode and the brightness adjustment mode (dimming mode) of a low electric power lighting the drive is performed in the low electric power lighting mode and a boost is performed as mentioned above.

Figure 4A:
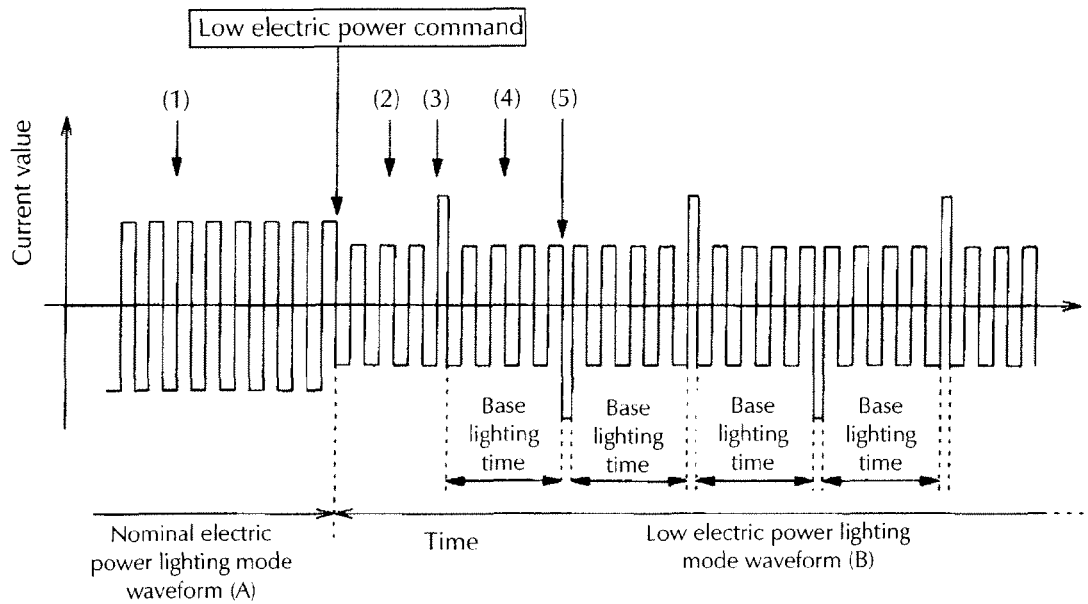
FIG. 4 is a schematic view showing an example for the lighting waveform according to the present invention, wherein the case of performing the boost at each half cycle is shown.
Figure 4B:
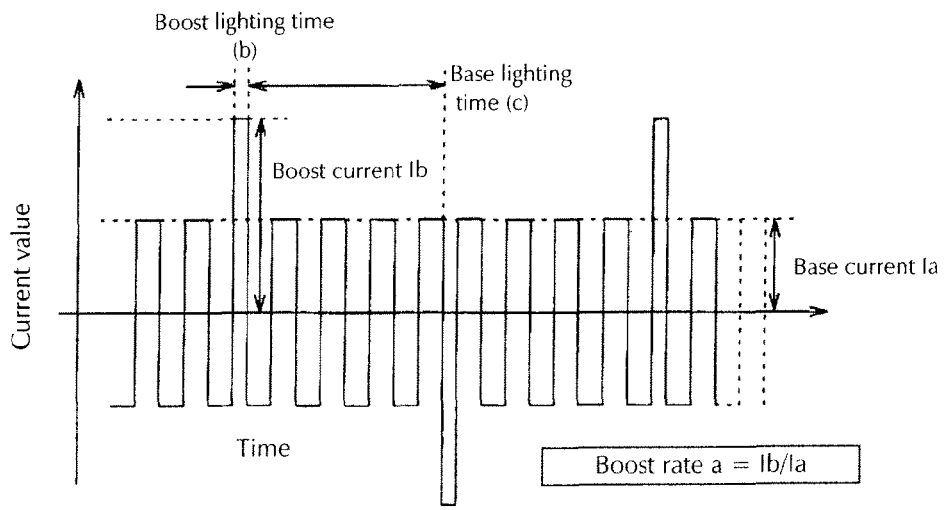

In the following, the lighting operation of the present invention is explained with reference to a waveform example. FIG. 4 is an example for the lighting waveform. FIG. 4(a) shows the current waveform at the times of a lighting with a nominal electric power mode and a low electric power lighting mode. In the low electric power lighting mode, the case of performing a half-cycle boost with a defined period is shown. FIG. 4(b) is an enlarged diagram of the waveform at the time of the low electric power lighting mode. The vertical axes in the drawings express the current value (the current value of the electrode 14a is shown positive) while the horizontal axes express the time. FIG. 5 is a view to explain the half-cycle boost operation in the low electric power lighting mode. At the boost time, the increase of the output electric power for only a half cycle is called half-cycle boost, and as mentioned below an increase of the output electric power over one cycle or a plurality of cycles is called full-cycle boost.

Next, the operation of the lamp light source device according to the present embodiment is explained for the case of the above mentioned half-cycle boost.

(1) When a lighting command is issued, the power supply to the lamp 10 starts and the lighting operation control unit 52a of the controller 52 generates a starter circuit drive signal, the starter circuit 3 is triggered and the lamp 10 is lighted.

(2) When the lamp 10 lights, the lighting power is calculated in the power control unit 52c from the voltage value V detected by the voltage dividing resistors R1, R2 and the current value I detected by the resistor Rx.

(3) The power control unit 52c of the controller 52 controls the switching element Qx of the step-down chopper circuit 1 based on the lighting power command signal and the above mentioned calculated electric power details and controls the lighting power. That is, the switching element Qx of the step-down chopper circuit 1 changes according to the duty of the gate signal Gx, and when a lighting power command (electric power regulation signal) is inputted from the outside, the duty of the switching element Qx is increased in case of a power-up, or the duty of the switching element Qx is decreased in case of a power-down, and a control of the gate signal Gx is performed such that an electric power value (electric power regulation signal) corresponding to the inputted lighting power command is obtained.

(4) At the nominal electric power lighting time with a high lighting power command value (larger than 70% of the rated electric power of the lamp), the drive signal selector 52b of the controller 52 outputs a drive signal having been determined beforehand corresponding to the nominal electric power lighting time by the drive signal generator 51 and drives the driver 4. In accordance with the nominal electric power lighting signal from the drive signal selector 52b, the power control unit 52c sets the output electric power to the nominal lighting electric power. By means of this, the full-bridge circuit 2 performs a polarity reversing operation according to the drive signal form the driver 4 and the lamp 10 lights with the waveform (A) of the nominal electric power lighting mode of FIG. 4(a).

(5) At the low electric power lighting time with a low lighting power command value, that is, at most 70% of the nominal electric power (practically 40 to 70%), the drive signal selector 52b of the controller 52 outputs a drive signal having been determined beforehand corresponding to the low electric power lighting time by the drive signal generator 51 and drives the driver 4. In accordance with the low electric power lighting signal from the drive signal selector 52b the power control unit 52c sets the output electric power to the low electric power lighting power. By means of this the full-bridge circuit 2 performs a polarity reversing operation according to the drive signal from the driver 4 and the lamp 10 lights with the waveform (B) of the low electric power lighting mode of FIG. 4(a). At the time of the low electric power lighting, the current value is increased as shown in FIG. 4(a) and (b) with a defined cycle and a boost lighting is performed.

Figure 5A:
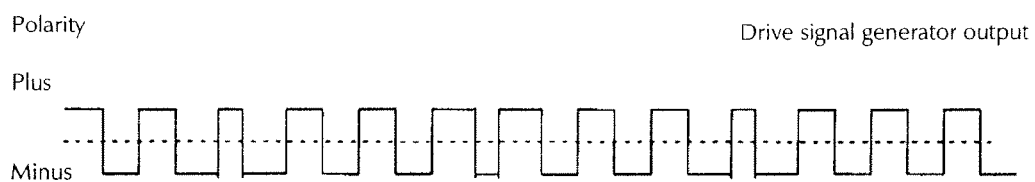
FIG. 5 is a schematic view explaining the half-cycle boost operation in the low electric power lighting mode.

The mentioned boost lighting operation will be explained by means of FIG. 5. In FIG. 5(a) the drive signal containing a boost lighting signal is outputted from the drive signal generator 51 at the time of the low electric power lighting, FIG. 5(b) is the boost signal, and FIG. 5(c) is the lamp current waveform (full-bridge circuit output) at the time of the low electric power lighting.

Figure 5B:
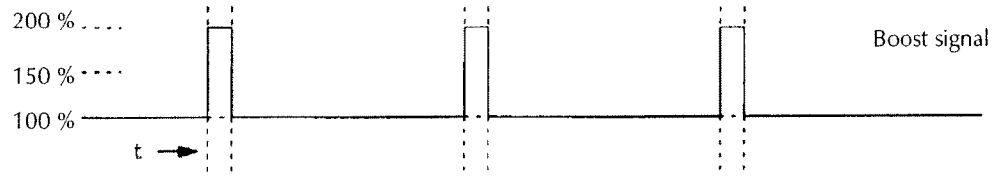
Figure 5C:
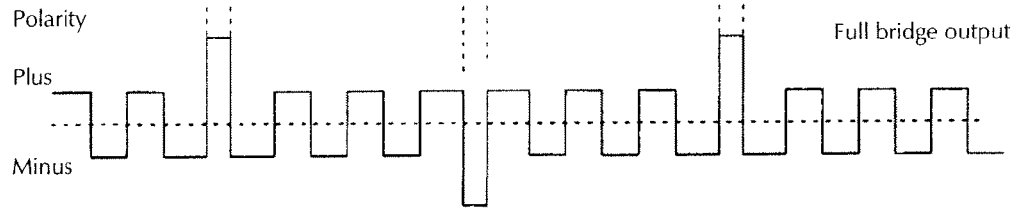

At the time of the low electric power lighting, the lighting operation control unit 52a outputs a boost signal with a determined cycle, as is shown in FIG. 5(b). In accordance with the boost signal, the drive signal selector 52b selects the drive signal containing the boost lighting signal shown in FIG. 5(a) from the drive signal generator 51 and outputs it to the driver 4. That means, the drive signal generator 51 outputs a drive signal wherein the drive signal for the boost lighting time is inserted periodically into the drive signal for the low electric power lighting time, as is shown in FIG. 5(a). The above mentioned boost signal is applied to the power control unit 52c, and the power control unit 52c increases the duty of the switching element Qx of the step-down chopper circuit 1 according to the boost signal and supplies a boost current being larger than the base current value. Therefore, as shown in FIG. 5(c), a boost current having a larger current value than the base current value is supplied to the lamp every time the boost signal is outputted.

In the following, a concrete numerical example for the waveform (A) is shown:
waveform at the nominal electric power lighting time: (A);
rated electric power: 180 W, 96 V, 2.4 A;
nominal electric power lighting frequency: 370 Hz.

Below, a concrete numerical example for the waveform (B) is shown:
waveform at the low electric power lighting time: (B);
electric power: 90 W, 73.5 V, 1.2 A;
low electric power lighting frequency: 1000 Hz;
boost rate: 4;
boost interval (c): 0.3 sec.

FIG. 6 is a schematic view of the electrode tip ends at each time shown in FIG. 4 (1) to (5) for the case of lighting the high pressure discharge lamp with the waveform shown in FIG. 4, and FIG. 7 shows the temperature change of the projection portion of the tip ends of the electrodes at the low electric power lighting time for the case of lighting the high pressure discharge lamp with the waveform shown in FIG. 7(a), whereas FIG. 7(b) shows the temperature change of electrode 14a (plus side) and FIG. 7(c) shows the temperature change of electrode 14b (minus side).

Referring to FIG. 4, FIG. 6 and FIG. 7, the relation between the lighting mode of this high pressure discharge lamp and the shape of the electrode tip end will be explained.

(1) At the nominal electric power operation time, the current value is comparatively high and the arc is held by means of primary projections formed at the tip ends of the spherical parts. These primary projections repeat a cycle of melting, evaporating and re-forming in a state, in which the arc attachment part at the tip end side is melted, and the primary projections are maintained.

Figure 6A:
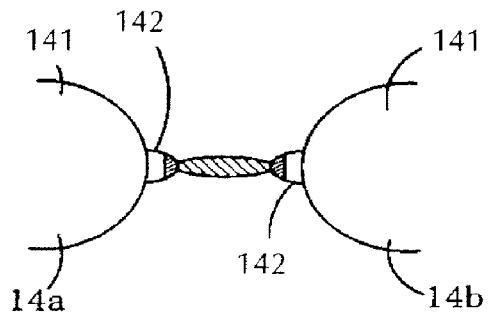
FIG. 6 is a schematic view showing the shape of the electrode tip end at each of the stages (1) to (5) of FIG. 4.
Figure 6B:
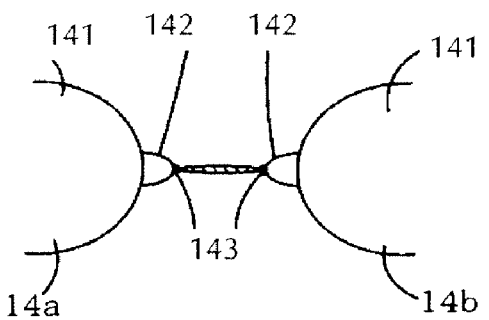

(2) When a switching to the low electric power lighting mode is performed by means of the lighting power command signal, the volume of the primary projections is large because of the decrease of the current value, and therefore a sufficient thermal electron release becomes difficult. To maintain the arc stably, secondary projections with a smaller volume are formed at the tip ends of the large primary projections, and the current density and the electrode tip end temperature are maintained as shown in FIG. 6(b).

Figure 6C:
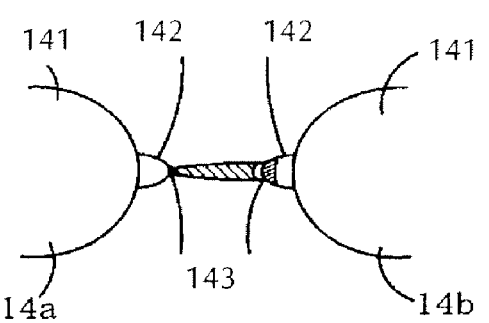

(3) When the current value of the low electric power lighting mode is continued, additional small projections form. The forming of a plurality of small projections leads to the generation of flicker within a short time. Therefore, the current value is increased temporarily (boosted) before the other projections are formed, and the temperature is increased and the secondary projections are maintained as shown in FIG. 6(c). As the tip end temperature of the electrode 14a increases at the time of the insertion of the boost current, it is thought to have the purpose of uniting the plurality of other small projections in the course of being formed to one projection. At the opposing electrode 14b, a temperature decrease occurs because of the electron outflow. But at the same time also a heat input occurs as the electrode 14b receives the radiation heat from the arc because of the increase of the current value, and therefore, the heat loss is not too excessive.

Figure 6D:
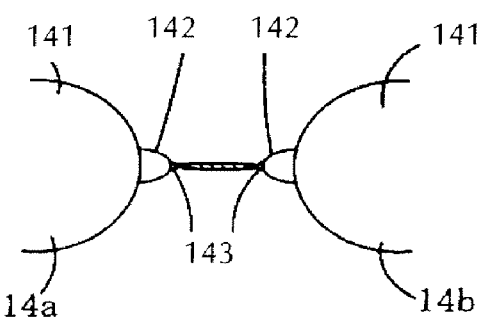

(4) When the lighting is performed again by means of the low electric power lighting mode, the electrode tip end temperature decreases with the current value and the arc becomes again smaller, but the arc is maintained by means of the secondary projections (FIG. 6(d)).

Figure 6E:
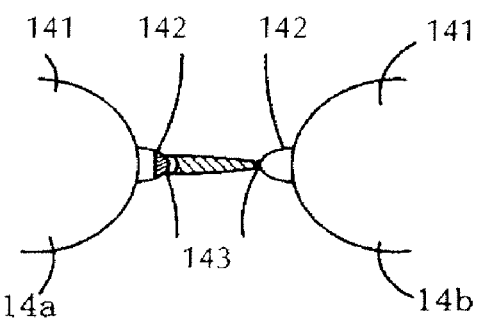

(5) When, subsequently, the boost current is applied while the polarity is reversed as to before, the tip end temperature at the electrode 14b on the opposite side increases (FIG. 6(e)), the plurality of other small projections in the course of being formed is united to one projection, and the secondary projections are maintained. At this time, a temperature decrease occurs at the electrode 14a because of the electron outflow, but the heat loss is not too excessive since, similar to above, also a heat input arises from the receipt of the radiation heat from the arc because of the increase of the current value.

Above, an explanation was made for the case of a half-cycle boost, but it is also possible to perform a full-cycle boost in which the boost is performed during one cycle.

Figure 8A:
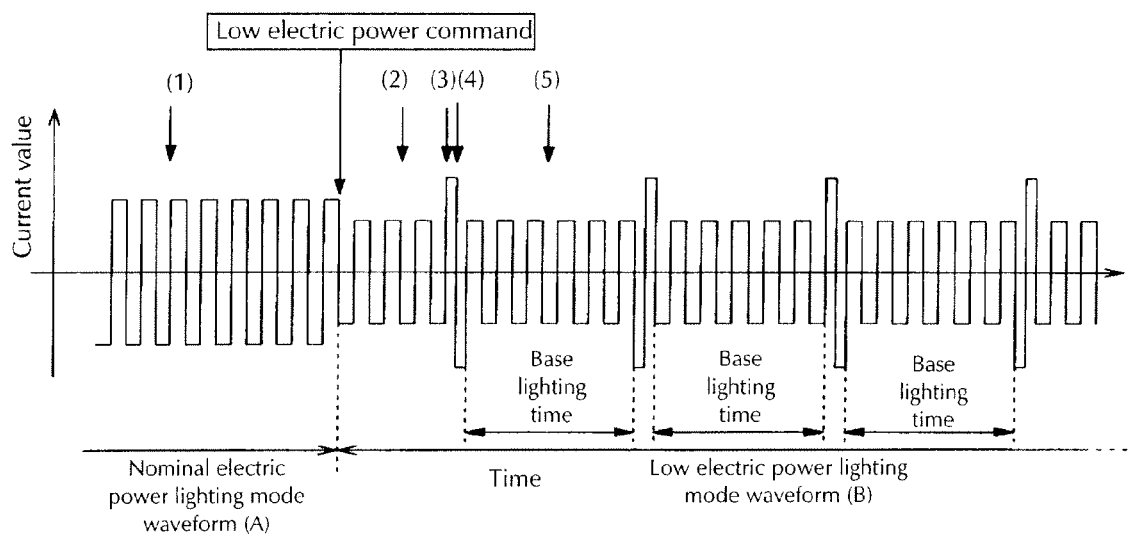
FIG. 8 is a schematic view showing another example for the lighting wave form according to the present invention, wherein the case of performing the boost during one cycle is shown.
Figure 8B:
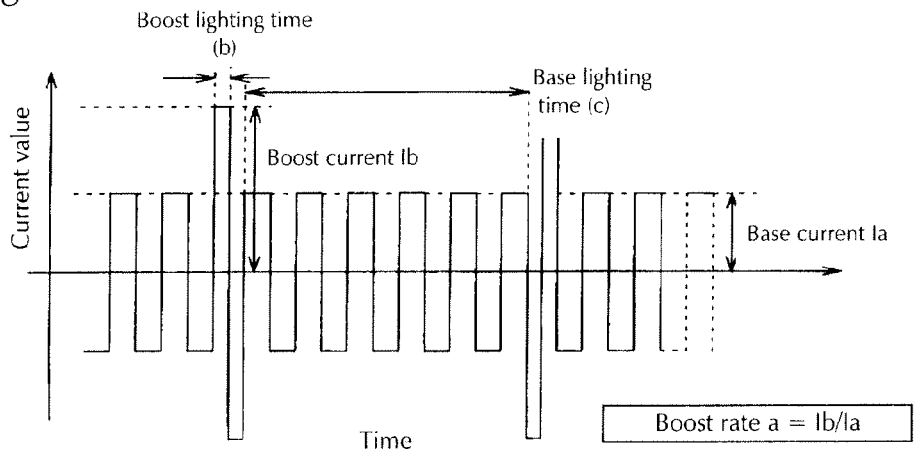

FIG. 8 is an example for the lighting waveform in the case of a full-cycle boost performing the boost during one cycle, wherein FIG. 8(a) shows the current waveform at the time of the lighting in the nominal electric power lighting mode and the low electric power lighting mode. For the low electric power lighting mode, the case of performing a half-cycle boost with a defined period is shown. FIG. 8(b) is an enlarged view of the waveform at the low electric power lighting mode. The vertical axes in the drawing express the current value (the current value of the electrode 14a is shown positive), and the horizontal axes express the time.

The case of FIG. 8 can be expressed such that the drive signal at the time of the boost lighting being inserted periodically into the drive signal at the time of the low electric power lighting, which is shown in the above mentioned FIG. 5, is implemented as a one-cycle signal such as the boost signal shown in FIG. 8, and the operation is basically the same as in the case of the above mentioned half-cycle boost.

FIG. 9 is a schematic view of the electrode tip ends at each time shown in FIG. 8 (1) to (5) for the case in which the high pressure discharge lamp is lighted with the waveform shown in FIG. 8, and FIG. 10 shows the temperature change of the projection portion of the tip ends of the electrodes at the low electric power lighting time for the case in which the high pressure discharge lamp is lighted with the waveform shown in FIG. 10(a), whereas FIG. 10(b) shows the temperature change of electrode 14a (plus side) and FIG. 10(c) shows the temperature change of electrode 14b (minus side).

Referring to FIG. 8, FIG. 9 and FIG. 10, the relation between the lighting mode of this high pressure discharge lamp and the shape of the electrode tip end will be explained.

(1) At the nominal electric power operation time, the current value is comparatively high and the arc is held by means of primary projections formed at the tip ends of the spherical parts.

Figure 9A:
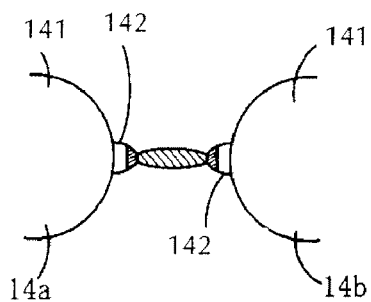
FIG. 9 is a schematic view showing the shape of the electrode tip end at each of the stages (1) to (5) of FIG. 8.
Figure 9B:
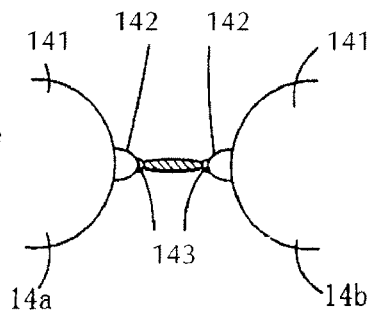

(2) When a switching to the low electric power lighting mode is performed by means of the lighting power command signal, the volume of the primary projections is large because of the decrease of the current value, and the electron release becomes difficult. To maintain the arc, secondary projections with a smaller volume are formed at the tip ends of the large primary projections, and the current density and the electrode tip end temperature are maintained as shown in FIG. 9(b).

Figure 9C:
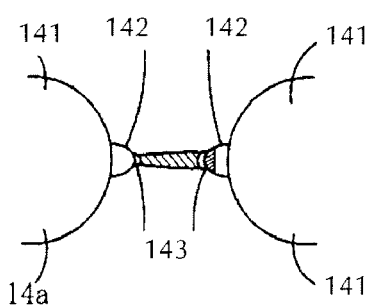

(3) When the current value of the low electric power lighting mode is continued, additional small projections form. The forming of a plurality of small projections leads to the generation of flicker within a short time. Therefore, the current value is increased temporarily (boost current) before the other projections are formed, and the secondary projections are maintained by increasing the temperature, as is shown in FIG. 9(c).

Figure 9D:
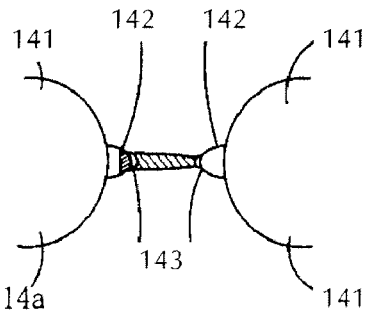

(4) When a boost current with a reversed polarity is applied, the tip end temperature of the electrode 14b on the opposite side increases, the plurality of other small projections in the course of being formed are united to one projection, and the secondary projections are maintained, as is shown in FIG. 9(d). At this time, a temperature decrease occurs at the electrode 14a because of the electron outflow, but the heat loss is not too excessive since, similar to above, also a heat input arises from the receipt of the radiation heat from the arc because of the increase of the current value.

Figure 9E:
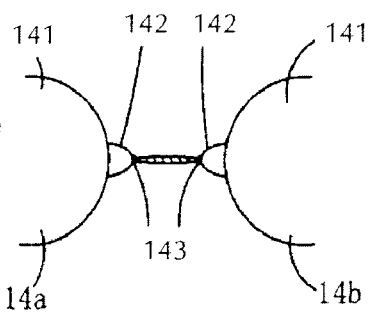
Figure 16:
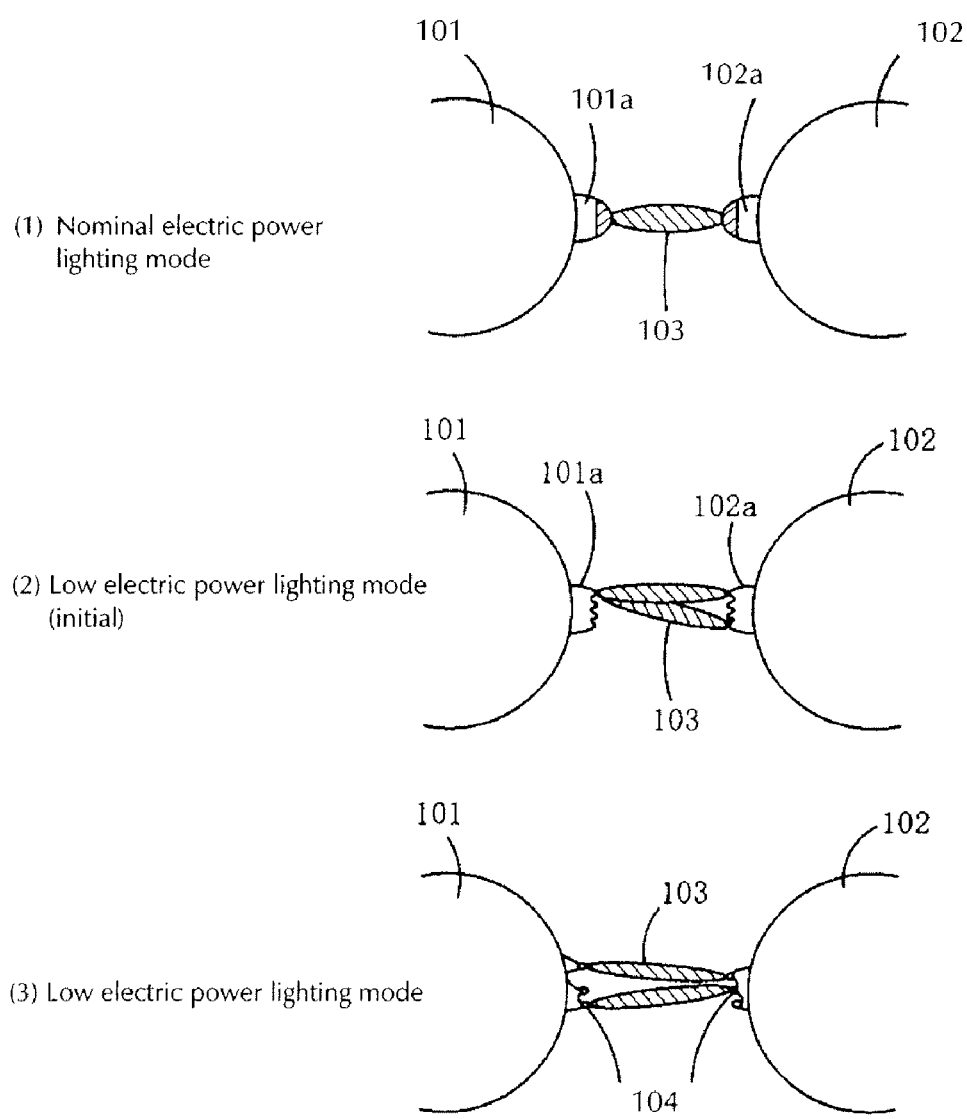
FIG. 16 is a schematic view explaining the electrode tip end shapes according to the known technique.

(5) When the lighting is performed again by means of the low electric power lighting mode, the electrode tip end temperature decreases with the current value and the arc becomes again smaller, but the arc is maintained by means of the secondary projections (FIG. 9(e)). Then, the polarity is reversed and a boost current flows similar to above. Thus, the tip end temperature at the electrode 14a is increased as shown in FIG. 10, and then the tip end temperature at the opposite electrode 14b is increased and the secondary projections are maintained.

Above, explanations were made for the cases of a half-cycle boost and a one-cycle boost, but it is also possible to perforin the half-cycle boost several times or to perform the full-cycle boost several times.

FIG. 11 is a view showing the lighting waveform for the case of performing the half-cycle boost several times and the temperature changes of the projection portion of the tip ends of the electrodes, wherein FIG. 11(b) shows the temperature changes of the electrode 14a (plus side) and FIG. 11(c) shows the temperature changes of the electrode 14b (minus side). This case can be realized by implementing the drive signal outputted at the boost time shown in the above FIG. 5(a) such that a plurality of half-cycle signals such as the boost signal shown in FIG. 11 is obtained. The operation is basically the same as mentioned above. By performing the half-cycle boost several times the tip end temperature of the electrodes 14a, 14b is increased similar to the above mentioned FIG. 10 and the secondary projections can be maintained, as is shown in FIG. 11.

FIG. 12 is a view showing the lighting waveform for the case of performing the full-cycle boost several times and the temperature changes of the projection portion of the tip ends of the electrodes, wherein FIG. 12(b) shows the temperature changes of the electrode 14a (plus side) and FIG. 12(c) shows the temperature changes of the electrode 14b (minus side). Also this case can be realized by implementing the drive signal outputted at the boost time shown in the above FIG. 5(a) such that a plurality of full-cycle signals such as the boost signal shown in FIG. 12 is obtained. The operation is basically the same as mentioned above. Also in this case the tip end temperature of the electrodes 14a, 14b is increased and the secondary projections can be maintained, as is shown in FIG. 12.

Next, the presence and absence of flicker was examined while changing the frequency at the time of the low electric power lighting, the boost rate, the boost width and the boost interval. Here, high pressure discharge lamps with a rated electric power consumption of 180 W, 275 W and 450 W respectively and a power supply device were used and the state of the electrode tip ends was examined while changing various conditions in the low electric power lighting mode. The high pressure discharge lamps used in this embodiment were configured as shown in the following table 1.

TABLE 1

| | Rated electric power (W) | Rated voltage (V) | Low electric power range (W) | Low electric power voltage (V) | Spacing between electrodes (mm) | Outer diameter of bulb (mm) | Internal volume ($mm^3$) | Mercury content ($g/mm^3$) | Electrode volume (in the discharge space) ($mm^3$) |
|---|---|---|---|---|---|---|---|---|---|
| Lamp 1 | 180 | 80 | 70-130 | 50-75 | 0.9 | 9.4 | 50 | 0.3 | 2.3 |
| Lamp 2 | 275 | 85 | 105-195 | 55-80 | 1.05 | 11.3 | 82 | 0.29 | 4.3 |
| Lamp 3 | 450 | 95 | 170-320 | 60-85 | 1.4 | 13 | 200 | 0.29 | 6.7 |

Regarding the electrode volume, it is known that with the electrode volume being y ($mm^3$) and the electric power being x (W), practical durability characteristics can be obtained when an optimization of the shape is performed employing generally the following formula (formula 2). But according to the shape, an error of about ±20% may occur for the volume from this relation formula. Here, this electrode volume is the volume of the electrode in the discharge space (including the portion of the electrode rod).

$$y = -0.000026 \times 2 + 0.032x - 2.56 \qquad \text{(formula 2)}.$$

In FIG. 13 to FIG. 15, test results are shown.

This test was an examination of the presence or absence of flicker when the lamps 1 to 3 shown in table 1 were lighted with low electric power, while changing the lighting frequency (Hz) at the time of the low electric power lighting, the boost rate (a) (boost current value Ib/base current value Ia), the boost width (b) (effective time of supply of the boost current Ib (A)) and the boost interval (c) (time of supply of the base current Ia (A) between boosts). In FIG. 13 to FIG. 15, the value of a×b÷c is shown for said a, b and c.

In FIG. 13 to FIG. 15 the occurrence of flicker is shown by hatching and the symbol 'x'.

This test shows the results for the performance of half-cycle boosts, but it is thought that there is effectiveness for both half-cycle boosts and full-cycle boosts.

From the above test it was found out that it is necessary to satisfy the following lighting conditions to perform a low electric power lighting without the occurrence of flicker:

a boost rate a of 1.2 to 3.5,
an effective supply time b of the boost current Ib (A) of 0.1 to 3 (ms),
a supply time c of the base current Ia (A) of 1 to 400 (ms).
Then, the following relation (formula 1) by said a, b and c must be satisfied:

$$0.0009 \leq a \times b \div c \leq 3.5 \quad \text{(formula 1)}.$$

This test example relates to lamps with a rated electric power from 180 to 450 W, but it is thought that by employing generally the same parameter conditions (formula 1) it is possible to stably maintain the secondary projections and to light the lamps stably without the occurrence of flicker during the low electric power lighting also for lamps with other rated electric powers than above.

The boost part is effective both in half cycles and in full cycles, but it is desirable to change the polarity of the boost current with every insertion. That means, the maximally reached temperature of the projection during the anode operation depends on the initial polarity, and when the initial polarity is fixed the temperature of the electrode of the side becoming the cathode at the initial polarity decreases too much and a plurality of secondary projections may be formed. When the initial polarity of the boost current is changed with every insertion of this current to avoid this problem, the energy of the heat input becomes equal at both electrodes and it is possible to maintain the temperature of both electrodes at the expected state.

The reason why the problem of the movement of the starting point of the arc by means of lighting with the above mentioned lighting conditions is solved is not clear, but to avoid a movement of the starting point it is necessary to avoid the generation of a plurality of secondary projections, and it can be assumed that the problem could be solved by uniting the plurality of secondary projections in the course of being formed to one while performing a heating and melting of the tip end of the primary projection.

On the basis of the above test and in (formula 1), a×b÷c can be understood as the energy applied to the electrode tip ends at that time. If this value is too low, the heating and melting of the tip end of the primary projection becomes insufficient, while if it is too high, the secondary projection melts and vanishes or is worn off by evaporation.

The heating of the electrode tip ends differs according to the combination of the several parameters. Therefore, the quality is not determined only by the value of a×b÷c, but the qualitative effect the respective parameters have is as follows.

(1) If the low electric power frequency is too low, the starting point of the arc during the cathode operation time is contracted too much and becomes unstable. Problems arise easily with lamps of particularly low power. If it is, on the other hand, too high, the arc becomes hardly contracted and secondary projections per se are hardly formed. Problems arise easily with lamps having electric power with a high current value.

(2) The height and width of the boost can be thought to be the energy applied for the heating and melting. If these values are too high, the secondary projections in the course of being formed melt and vanish or are worn off by evaporation. If they are too low, the tip ends of the primary projections cannot be heated and melted as necessary and sufficiently, and therefore a plurality of secondary projections is formed.

(3) In the practical implementation it is necessary to perform the heating as often as necessary and sufficient for the maintenance of the secondary projections, and a suitable boost insertion interval is necessary. If this interval is too short the heating is too much and the secondary projections per se melt and vanish or are worn off by evaporation. If the interval is too long, the tip ends cannot be heated and melted as necessary and sufficiently, and therefore a plurality of secondary projections is formed.

If at the time of the switching from the rated electric power to the low electric power lighting mode a method is employed by means of which the electric power is not reduced at once but step-wise or an up/down is repeated, it is possible to form suitable secondary projections within a short time. If the maintenance of the secondary projections is performed effectively, an increase of the arc gap resulting from the time of lighting can be suppressed. This is possible by performing the lighting while choosing even better-suited values according to the state of the projections from the above mentioned parameter ranges. For example, the lighting can be performed while suitable values according to the state of the projections are chosen by using a lighting power source which is programmed such that the lamp voltage is detected and the suitable parameters are chosen according to this value. As a result, an even longer durability of the lamp can be realized.

What is claimed is:

1. A high pressure discharge lamp light source device, comprised of a high pressure discharge lamp having a discharge vessel made from quartz glass and a pair of electrodes arranged oppositely to each other with a spacing of at most 2.0 mm, each electrode having a projection formed at a tip end thereof, and mercury of at least 0.20 mg/mm$^3$ and a halogen being enclosed in said discharge vessel; and a power supply device for supplying alternating current to said high pressure discharge lamp, wherein the power supply device is adapted to switch between a nominal electric power lighting mode and a low electric power lighting mode, said current in the low electric power lighting mode having a defined current value in a range of 40% to 70% of the nominal electric power consumption, wherein said power supply device, in the low electric power lighting mode, is adapted to alternatingly supply to said high pressure discharge lamp a base current having a defined frequency chosen from a range between 100 Hz and 5 kHz and a boost current having a higher current value than a current value of said base current, and wherein said power supply device satisfies the following conditions:

a boost rate a of 1.2 to 3.5,
an effective supply time b of the boost current of 0.1 to 3 ms, and
a supply time c of the base current of 1 to 400 ms;

and wherein the parameters a, b and c are chosen such as to satisfy the formula $$0.0009 \leq a \times b \div c \leq 3.5,$$

with the boost rate a being a quotient of Ib/Ia, Ib being the value of the boost current and Ia being the value of the base current, b being the effective supply time in ms in which said the boost current of value Ib is supplied to one electrode, and c being the time in ms in which the base current of value Ia is supplied.

* * * * *